United States Patent
Sarup et al.

(10) Patent No.: US 12,275,913 B2
(45) Date of Patent: Apr. 15, 2025

(54) METHOD AND SYSTEM FOR EXTRACTING AN OIL FROM AN OIL-CONTAINING RAW MATERIAL

(71) Applicant: ALFA LAVAL CORPORATE AB, Lund (SE)

(72) Inventors: Bent Sarup, Fredensborg (DK); Giacomo Costagli, Milan (IT)

(73) Assignee: ALFA LAVAL CORPORATE AB, Lund (SE)

( * ) Notice: Subject to any disclaimer, the term of this patent is extended or adjusted under 35 U.S.C. 154(b) by 716 days.

(21) Appl. No.: 17/600,932

(22) PCT Filed: Mar. 12, 2020

(86) PCT No.: PCT/EP2020/056592
§ 371 (c)(1),
(2) Date: Oct. 1, 2021

(87) PCT Pub. No.: WO2020/200682
PCT Pub. Date: Oct. 8, 2020

(65) Prior Publication Data
US 2022/0195328 A1     Jun. 23, 2022

(30) Foreign Application Priority Data
Apr. 3, 2019   (EP) .................................... 19425023

(51) Int. Cl.
C11B 1/06      (2006.01)
A23D 9/04      (2006.01)
C11B 1/04      (2006.01)

(52) U.S. Cl.
CPC ................. *C11B 1/06* (2013.01); *A23D 9/04* (2013.01); *C11B 1/04* (2013.01)

(58) Field of Classification Search
CPC ................. C11B 1/04; C11B 1/06; C11B 1/10
See application file for complete search history.

(56) References Cited

U.S. PATENT DOCUMENTS

| | | |
|---|---|---|
| 4,808,426 A | 2/1989 | Strop et al. |
| 4,944,954 A | 7/1990 | Strop et al. |
| (Continued) | | |

FOREIGN PATENT DOCUMENTS

| | | |
|---|---|---|
| CN | 101550377 A | 10/2009 |
| CN | 101805664 A | 8/2010 |
| (Continued) | | |

OTHER PUBLICATIONS

Apollo Olive Oil, "The Olive Press", Oct. 19, 2018, XP2785900A. (2 pages).

(Continued)

*Primary Examiner* — Yate'K Cutliff
(74) *Attorney, Agent, or Firm* — BUCHANAN INGERSOLL & ROONEY PC

(57) ABSTRACT

The present invention relates to a method and system of extracting an oil from an oil-containing raw material comprising the steps of providing a non-crushed oil-containing raw material, and treating the non-crushed oil-containing raw material. The treatment is performed by exposing the oil-containing raw material to vacuum, wherein the vacuum defines an absolute pressure of between 1 mm Hg and 150 mm Hg, and a temperature of between 0° C. and 45° C., and by subjecting the oil-containing raw material to crushing, simultaneously and/or subsequently to the step of exposing the oil-containing raw material to the vacuum, to provide a treated oil-containing raw material. By the method and system, high yield of oil with high quality can be obtained.

23 Claims, 5 Drawing Sheets

(56) References Cited

U.S. PATENT DOCUMENTS

| | | | | |
|---|---|---|---|---|
| 6,309,652 | B1 * | 10/2001 | Aeschbach | C11B 1/06 514/557 |
| 2016/0053199 | A1 | 2/2016 | Clodoveo | |

FOREIGN PATENT DOCUMENTS

| | | | |
|---|---|---|---|
| CN | 102850416 | A | 1/2013 |
| CN | 105368570 | A | 3/2016 |
| EP | 0 811 678 | A1 | 12/1997 |
| EP | 1123367 | A1 | 8/2001 |
| EP | 3059298 | A1 | 8/2016 |
| FR | 2858982 | A1 | 2/2005 |
| GB | 04661 | * | 5/1911 |
| GB | 4661 | A | 5/1911 |
| WO | 03099975 | A1 | 12/2003 |
| WO | 2019057927 | A1 | 3/2019 |

OTHER PUBLICATIONS

Belitz, H.-D., et al., "Enzymes", Food Chemistry, 2nd Edition, Chapter 2, pp. 92-151, Springer-Verlag Berlin Heidelberg, Germany, 1987 (month unknown) and 1999 (month unknown). (33 pages).

Cassiday, Laura, "Red Palm Oil", AOCS Your Global Fats and Oils Connection, Feb. 2017, The American Oil Chemists' Society. (9 pages).

Di Giovacchino, L., "Olive Oil Extraction by Pressing, Centrifugation and Percolation: Effect of Extraction Methods on Oil Yields", OLIVÆ, Science and Techniques (with English translation), Apr. 1991, pp. 14-41, No. 36. (31 pages).

Fadda, C., et al., "Changes during storage of quality parameters and in vitro antioxidant activity of extra virgin monovarietal oils obtained with two extraction technologies", Food Chemistry, 2012 (month unknown), pp. 1542-1548, vol. 134, XP028484452, Elsevier Ltd. (8 pages).

International Search Report (PCT/ISA/210) and Written Opinion (PCT/ISA/237) mailed on Jun. 16, 2020, by the European Patent Office as the International Searching Authority for International Application No. PCT/EP2020/056592. (10 pages).

Khlif, M., et al., "Continuous-flow olive oil extraction in Tunisia:operating procedures," OLIVÆ, Science and Techniques, Apr. 2003, pp. 38-42, No. 96. (8 pages).

Kiritsakis, Apostolos, et al., "Olives and Olive Oil as Functional Foods: Bioactivity, Chemistry and Processing", Functional Food Science and Technology, 2017 (month unknown), Chapter 1, pp. 1-8, John Wiley & Sons, Ltd. (30 pages).

Migliorini, M. et al., "Influence of enzymes and technology on virgin olive oil composition", Critical Reviews in Food Science and Nutrition, vol. 57, pp. 3104-3126, 2017 (month unknown), XP9508831A (12 pages).

Peres, Fátima, et al., "Influence of enzymes and technology on virgin olive oil composition", Critical Reviews in Food Science and Nutrition, 2017 (month unknown), pp. 3014-3026, vol. 57, No. 14, Taylor & Francis Group, LLC. (24 pages).

Quirasco, B.M., et al., "Enzimas", Quimica de Alimentos, 2006 (month unknown), Chapter 5, pp. 301-361, 4th Edition, Pearson Educación de México, S.A. de C.V., Mexico. (738 pages), discussed on page two of application.

Richardson, Thomas, et al., "Enzymes", Food Chemistry, Food Science and Technology, 2001 (month unknown), Chapter 6, pp. 371-476, 2nd Edition, Marcel Dekker, Inc., New York, NY. (58 pages).

Veneziani, Gianluca, et al., "Improvement of Olive Oil Mechanical Extraction: New Technologies, Process Efficiency, and Extra Virgin Olive Oil Quality", Products of Olive Tree, 2016 (month unknown), Chapter 2, pp. 21-42, INTECH. (23 pages).

Vugts, J.A., "Palm Oil Processing, The Principles & Operational Techniques", (exact publication date unknown, but retrieved from https://vdocuments.site/palm-oil-process-the-principle-operational-techniques.html on Sep. 18, 2018), pp. 1-269. (269 pages).

Wikipedia, "Olive oil extraction", Jun. 9, 2020, Wikimedia Foundation, Inc., https://en.ikipedia.org/wiki/Olive_oil_extraction. (9 pages).

Amirante, P., et al., "Una Gramola Innovativa Per L'Ottimizzazione Del Processor di Estrazione Meccanica e per Enfatizzazione del Ruolo Funzionale Degli Oli Vergini di Oliva", IX Convegno Nazionale dell'Associazione Italiana de Ingegneria Agraria, Ischia Porto, Sep. 12-16, 2009, memoria n. 9-3. (9 pages).

Servili, Maurizio, et al., "Influence of the Decrease in Oxygen during Malaxation of Olive Paste on the Composition of Volatiles and Phenolic Compounds in Virgin Olive Oil", Journal of Agricultural and Food Chemistry, 2008 (month unknown), pp. 10048-10055, vol. 56, American Chemical Society. (8 pages).

Clodoveo, Maria Lisa, "An overview of emerging techniques in virgin olive oil extraction process:Strategies in the development of innovative plants", Journal of Agricultural Engineering, Jun. 2013, pp. 297-305, vol. XLIV(s2), PAGEPress Publications, Pavia, Italy. (12 pages).

Braadbaart, F., et al."Charred olive stones:experimental and archaeological evidence for recognizing olive processing residues used as fuel", Vegetation History and Archaeobotany, Feb. 26, 2016, pp. 415-430, vol. 25, Issue 5, DOI 10.1007/s00334-016-0562-2, Springer. (17 pages).

Office Action (The First Office Action) issued Apr. 10, 2023, by the National Intellectual Property Administration, P. R. China in corresponding Chinese Patent Application No. 202080040808.6 and an English translation of the Office Action. (16 pages).

Office Action (Communication pursuant to Article 94(3) EPC) issued Sep. 29, 2023, by the European Patent Office in corresponding European Patent Application No. 20 710 149.4-1105. (10 pages).

* cited by examiner

METHOD AND SYSTEM FOR EXTRACTING AN OIL FROM AN OIL-CONTAINING RAW MATERIAL

TECHNICAL FIELD

The present disclosure relates to a method of treating an oil-containing raw material and to a system for treating an oil-containing raw material as defined in the appended claims.

BACKGROUND ART

The process of producing oil from oily fruits utilising physical means is widely known, and current techniques are based on principles similar to those used for centuries. However, a great deal of the manual work has been replaced by machines which cut labour costs and time. One of the main changes in production process of either olive oil or the production process of any other oil from an oily fruit was caused by the introduction of utilizing centrifugal force to separate oils from a fruit pulp, also referred to as a paste, after malaxing. The utilization of centrifuge for the separation step makes it possible to utilize continuous systems for the oil production.

The traditional oil producing processes comprise steps of debranching, leaf removal and washing the raw material, i.e., the freshly harvested oily fruit. In order to obtain the oil, a series of steps are applied, which may comprise for example crushing/depitting of the oily fruit to provide a paste, malaxing the paste, pressing/centrifuging the paste, and vertical decanting/centrifuging.

Oil quality, as quality of all food, must comply with certain organoleptic features to be apt for consumption. Particularly, olive oil is classified by its quality into olive oil, virgin olive oil and extra virgin olive oil. The two main features that determine the quality of the oil are the acidity value and the peroxide value. These properties are directly affected by the olive oil extraction and conservation method. Mention should also be made to the quality of the raw material, the phytosanitary condition, the harvest system, e.g. that there are no broken or bruised olives, and the time between harvesting and extraction. If time is long, there is a risk that the final product will deteriorate.

A frequent practice at some facilities is to process the olives while they have been freeze injured. That is a mechanical rupture of the oily fruit tissue is created by freezing, therefore producing cellular burst by freezing and subsequent dehydration. As a result, yield is increased, but the olive oil quality is substantially reduced.

Rancidity of fats and oils is a natural process by which their composition is altered with time, which causes, among other things, a change in their organoleptic properties, i.e., a change in flavour. Specifically, the flavour of the oils which have undergone an intense oxidative process is called rancid. In a hydrolytic rancidity, the lipases present in the olive pits catalyze glyceride hydrolysis, producing free fatty acids and partial glycerides. As a consequence, the acidity in the olive oil is increased. During the obtention of said oil, the hydrolytic reaction is produced in the oil-water interface and increases exponentially during the emulsification of the olive paste as disclosed in Richardson T., Hylsop D. (2001). Chapter 6 In "Quimica de Alimentos" Fennema O. Ed Acribia; Belitz H. D., Grosch W. (1997). Chapter 2 In "Quimica de Alimentos" 2° Ed Acribia, Zaragoza and in Quirasco B. M., Lopez-Mungia A. C. (2006). Chapter 5 In "Quimica de Alimentos" Badui D. S., 4° Ed Pearson Education.

The acidity is expressed in grams of oleic acid per 100 g of olive oil and it is called acidity percent. The free fatty acids are essentially assessed using this percent, and it can be related not only to the features of the raw material used but also to the processing method. So, for example, the quality of the olive oil is directly related to the hydrolysis degree of the component triglycerides. As this degree increases, the amount of free fatty acids increases, thus increasing their acidity, with a proportional detriment in olive oil quality.

The oxidative rancidity is due to the oxidation of double bonds in the unsaturated fatty acids with peroxide or hydroperoxide formation, which later polymerize and break down, resulting in the formation of aldehydes, ketones and lower molecular weight acids. This process is accelerated in the presence of oxygen, light, heat, humidity, other free fatty acids, and certain inorganic catalysts such as iron and copper salts. Fats that have undergone oxidation have an unpleasant flavour and scent and may be slightly toxic for some individuals. Oxidative rancidity also destroys fat-soluble and water-soluble natural antioxidants. These are the main components of olive oil that provide health benefits. Among them are the following: tocopherols, carotenoids, phenolic fraction, among others.

The most important phenolic fraction in the olive is represented by:
  Phenyl alcohols: 3,4-dihydroxyphenyl-ethanol, hydroxytyrosol, P-hydroxyphenyl ethanol and Tyrosol;
  Flavonoids: anthocyanins, rutin and leteoline-7-glucoside;
  Secoiridoids: oleuropein, dimethyloleouropein, ligustroside and vervascoside; and
  Phenolic acids: elenoic acid.

The main role of antioxidants is to prevent, delay, and/or revert reactions leading to the oxidation of biological substrates (proteins, lipids, and nucleic acids).

An important parameter to determine the quality of olive oil is through UV spectroscopy. Absorbance measurements are taken at different wave lengths. This analysis provides indications about the quality of a specific oil and its preservation status. It is also used to detect the abnormal components in virgin olive oil and, as well as the peroxide value, the primary oxidation stages in the oil.

During the process of withdrawing and processing oil from an oily fruit, the oil will be exposed to oxygen, resulting in oxidation. Oxidation of the oil results in loss of volatile aromas and loss of beneficial micro-nutrients such as polyphenols (anti-oxidants). Furthermore, oxidation will result in unfavourable change in flavour and thereby the quality and flavour characteristic of the oil. Due to the negative effect exposure to oxygen and resulting oxidation has on the oil, it is known in the art to operate a malaxing or milling process under limited or mild vacuum to limit the exposure to oxygen. Thus, to improve the quality of olive oils, there have been efforts to improve the storage quality of olive oils by reducing exposure to oxygen. For example, Migliorini M. et al. (2008). "Influence of operating conditions of malaxation on the quality of extra virgin olive oil", J. Agric. Food Chem, v. 56, p. 10048-10055 discloses how olive oil quality is negatively affected by exposure to oxygen due to oxidation and accordingly how the quality can be improved by limiting the oxygen exposure of the extra virgin olive oil. In C. Fadda, A. Del Caro, A. M. Sanguinetti, P. P. Urgeghe, V. Vacca, P. P. Arca, 1, A. Piga "Changes during storage of quality parameters and in vitro antioxidant activity of extra virgin monovarietal oils obtained with two extraction technologies", Food Chemistry, vol. 134, p. 1542-1548 (2012) it is disclosed how utilization of reduced oxygen pressure (0.2 atm absolute or 152 mm Hg absolute) during malaxation will improve storage of olive oil or preserve the quality of the olive oil. Olive oil producers have reported the same effect positive effects of applying vacuum during malaxing (http://apollooliveoil.com/press.php) to reduce exposure to oxygen. An additional document WO2019/057927 shows a method of extracting oil from a paste by exposing the paste to vacuum. However, while there still remains a need to reduce harmful effects caused by exposure to oxygen, it is still desirable to maintain positive effects obtained by exposure to oxygen, e.g. effects to the taste of an oil. At the same time it is desirable to increase yield in oil extraction while high quality of the oil can be achieved.

In Clodoveo, Maria Lisa, "An overview of emerging techniques in virgin olive oil extraction process"; Journal of Agricultural Engineering, vol. XLIV, p 297-305 (2013)) the use of pulsed electric field, power ultrasound or microwave radiation for furthering the oil release during olive oil production among other emerging techniques is disclosed. However, none of the new, emerging technologies disclosed does have the same beneficial effect of vastly improved oil release and improved oil quality without raising the temperature.

Use of vacuum cookers with optional aroma or flavour recovery units for water removal and improved aroma recovery within the food industry in general is also known. By utilizing vacuum cookers, the temperature during food processing can be lowered, resulting in milder conditions and increased quality of the processed food. However, there still remains a need to increase yield in oil extraction while high quality of the oil can be achieved.

Other oily fruits utilized for oil production is palm fruit and avocado. The production process of palm oil has been traditionally different from the process utilized for olive oil, utilizing much higher temperature and harsher methods. During the production process of palm oil, the oil is extracted from the palm fruit in so-called palm oil mills. In the front end of the process the fruit bunches are "sterilized" at elevated pressure by steam injection at around 145° C., for 90-120 min, where the palm bunches are both cooked or softened and sterilized. After the sterilization step the palm fruit can be easily separated from palm bunches as the fruit has been softened. Furthermore, owing to the increased humidity of palm fruit after the high temperature steam injection, the crude palm oil can be more easily extracted from the palm fruit in subsequent operations. The pulp or oily meat is then processed in a "digester" (typically steam jacketed, stirred vessels operating 15-20 min at 90-95° C., see the disclosure of Vugts, J. A., "Palm Oil Process The Principle & Operational Techniques", https://vdocuments-.site/palm-oil-process-the-principle-operational-techniques.html (retrieved 18 Sep. 2018). Because of the sterilizing and cooking and the mechanical action of threshing and mashing, the palm pulp (or oily fruit meat) becomes soft and changes in the cell structure of the tissue occur, resulting in an easier extraction of oil from the pulp. Finally, the oil is separated from the pulp, traditionally by utilizing a screw press to produce a crude oil and an oily, solid waste.

As explained above, it is known from prior art that treating a palm fruit with high temperature will soften and damage the fruit meat structure resulting in an easier release of the palm oil. That kind of treatment has been unthinkable for the much more heat sensitive and expensive olive oil. Temperature control during olive oil production is highly important, as temperature above 30° C. adversely affects the quality of the oil, as the natural flavours and nutrients in olive oil are very temperature sensitive. However, in principle there could be considerable potential in extracting crude palm oil at mild conditions for maximum preservation of nutrients and antioxidants, to produce a high quality of what is known as "red palm oil" (https://www.aocs.org/stay-informed/read-inform/featured-articles/red-palm-oil-february-2017). Red palm oil is a kind of "virgin palm oil", with maximum preservation of nutrients, one of those being the red coloured carotenes a pre-cursor to vitamin A, which gives it its name. Such virgin oil will only require a mild post-treatment to adjust it organoleptic properties for the oil to acceptable to most consumers.

A further oil production industry similar to the one described is the avocado oil production industry. Briefly, it comprises three stages:

Washing and crushing/depitting: After harvesting, the avocados are washed. Then the avocado pulp is crushed, with or without the pit, to obtain a paste.

Malaxing: During the malaxing, the paste is gentle mixed and heated at 45-55° C. for a time from 45 to 120 minutes, then the oil is released from the oil cells where it is encapsulated. Consequently, this stage is decisive for the avocado oil yield and quality.

Separation: After malaxing, the paste is pumped into the decanter (2 or 3-phase) for its subsequent separation. As a result, the paste is separated into oil, water (vegetation water plus added water) and solids (3 phases). Besides, dilution water is added to fluidize it. On the other hand, in the two-phase process, the paste is separated into a light phase (oil) and a solid phase (pomace). The two-phase process requires little or no addition of dilution water depending on the humidity content of the raw material.

So far, no methods have been developed that allow obtaining high yields of high-quality oils at a low temperature in a short time. To obtain olive oil in high yields using the current methods, the malaxing step must be extended to considerably over 1 hour if the temperature is kept low. Other solution for increase in oil yield is to raise the temperature to above 30° C. And for a significantly increased yield both the malaxing time and the temperature have to be changed. Both of those factors significantly deteriorate the quality of the oil. Additionally, for good oil yields, the current methods need to start from raw materials, such as olives with adequate ripeness for the tissues to soften, and preferably also with low humidity.

Therefore, despite efforts in improving the oil producing processes, there is still a need for a method and system in which the yield of the oil is increased, while it is possible to obtain high quality oils, such as extra virgin olive oils.

SUMMARY OF THE INVENTION

It is thus an objective of the present invention to provide a method and system for treating an oil-containing raw material so that harmful effects caused by exposure to oxygen can be decreased. It is also an objective to increase the yield of an oil while high quality oils can be obtained.

It is also an objective of the present invention to provide a method for treating an oil-containing raw material and a method for oil extraction which is suitable for different oil-containing raw materials. Especially, it is an objective to provide a method which is suitable for plant-based oil-containing raw materials, such as fruits, especially olives.

The objectives above are attained by a method of treating an oil-containing raw material according to the present invention as defined in the appended claims. The method comprises the steps of providing a non-crushed oil-containing raw material, and subjecting the oil-containing raw material to crushing at a reduced absolute pressure, which is below an atmospheric pressure, to provide a crushed oil-containing raw material. In this way, it is possible to control the partial oxygen pressure already at the beginning of an oil extraction process, whereby harmful effects caused by exposure to oxygen can be decreased while the positive effects still can be obtained.

The reduced absolute pressure can be for example between 1 and 700 mm Hg, or between 100 and 650 mm Hg, or between 150 and 600 mm Hg, or between 200 and 550 mm Hg. Preferably, however, the reduced absolute pressure is between 1 and 150 mm HG, more preferably between 4 mm Hg and 95 mm Hg, and most preferably between 20 mm Hg and 50 mm Hg. The reduced absolute pressure may be provided successively. For example, in the beginning of crushing, the absolute pressure may be close to the atmospheric pressure but can be successively decreased. Thus, the oxygen partial pressure can be effectively controlled and adapted to a specific raw material and other process conditions.

The method may comprise a step of vacuum malaxing by exposing the non-crushed or crushed oil-containing raw material to a deep vacuum, wherein the deep vacuum defines an absolute pressure of between 1 mm Hg and 150 mm Hg, and a temperature of between 0° C. and 45° C. The vacuum causes release of oil, water vapor and flavours from the oil-containing raw material. Thus, by combining the crushing of the oil-containing raw material at a reduced absolute pressure with the deep vacuum exposure, it is possible to control the partial oxygen pressure throughout a whole oil extraction process, whereby harmful effects caused by exposure to oxygen can be decreased while the positive effects still can be obtained. Additionally, high yield of high-quality oil can be obtained. Thus, significant improvements compared to the known processes may be obtained.

the vacuum may during the crushing and the vacuum malaxing range from nearly atmospheric down to a pressure and temperature regime where boiling of water or significant evaporation takes place, being an absolute pressure range between 1 mm Hg and 150 mm Hg, and a temperature between 0° C. and 45° C.

Thus, according to the current invention, vacuum is used for crushing a non-crushed oil-containing raw material, such as olives, to both control the partial pressure of oxygen during the crushing step and, depending on the vacuum level, to also cause water to boil or evaporate significantly. When the water boils, the oily fruit pulp is softened and damaged and hence the release of oil is enhanced. It has surprisingly been discovered that the use of vacuum both during crushing and vacuum malaxing at a low temperature, will not only inhibit the adverse effect of oxygen on the oil quality, but will substantially improve the oil yield over conventional methods, without negatively affecting the quality of the oil. What is more, the method disclosed in the current invention not only considerably increases the oil yield, it also improves the quality of the oil obtained.

The method disclosed in the current invention also allows for processing olives or other oil-containing raw material, of different ripeness and softness and of different humidity degrees, without negatively affecting the oil yield obtained.

Furthermore, by exposing the oily raw material to vacuum already at crushing as claimed, it also eliminates the addition of extraction aids during the extraction process and prevents antioxidant destruction, reducing oxidative rancidity by eliminating the presence of oxygen during most of the process.

The method may comprise adapting the absolute pressure and temperature in the vacuum to correspond to a ratio where the water in oil- and water-containing cells starts to boil or simmer, or keep the ratio within 50 mmHg of a saturated vapor pressure of the water in the in the oil- and water-containing cells. Thus, a deep vacuum is applied to the raw material for the purpose of withdrawing water or vapor from the pulp of the oily fruit. The deep vacuum may be applied to vacuum malaxing and/or during crushing. Thereby increased release of oil from the pulp can be obtained. The absolute pressure of the vacuum may be adapted to between 4 mm Hg and 95 mm Hg, preferably between 20 mm Hg and 50 mm Hg. The temperature during the vacuum exposure may be kept between 10° C. and 35° C., preferably between 20° C. and 30° C., whereby the natural flavours and nutrients in olive oil are not negatively affected.

In one aspect of the invention, the vacuum malaxing may be performed before or after the step of crushing, i.e. the raw material may be crushed before or subsequent to astep of exposing the raw material to pressures from atmospheric to the deep vacuum. In this way, the crushing arrangement may be positioned outside a vacuum vessel, whereby the construction of the vacuum vessel may be simplified.

According to another aspect of the invention, the raw material may be crushed simultaneously with the step of exposing the raw material to the pressures from atmospheric to the deep vacuum. In this way, the crusher may be provided inside a vacuum vessel for a more compact construction of an oil extraction facility. Additionally, a fine paste can be provided in the vacuum vessel and thus easier handling of the raw material in the subsequent operations can be obtained.

The method may further comprise a step of injecting a controlled amount of air to the vacuum vessel during or after the step of crushing. This may be an advantage since, as water vapor will displace the air initially present in a vacuum vessel, the possibility to add air in a controlled manner to the vacuum vessel ensures an optimum development of polyphenols and other oxygenated compounds and their breakdown products contributing to an increased olive oil quality.

The method may further comprise agitating the oil-containing raw material during exposure to the vacuum. This assists in exposing all the raw material to the vacuum, keeping the temperature as even as possible and continuing breaking up of the raw material via additional shear force.

In the step of exposing the oil-containing raw material to vacuum in the vacuum vessel, especially to the deep vacuum during vacuum malaxing, the exposure time may be between 10 minutes and 60 minutes, preferably between 20 minutes and 30 minutes, such as about 25 minutes. Thus, the vacuum exposure, also referred to as vacuum malaxing, can be performed over a shorter period of time than traditional malaxing, but will nevertheless lead to a high yield and quality.

The method may comprise repeating the steps of crushing and/or vacuum malaxing. In this way, the yield may be further increased.

The method may further comprise a step of separating the oil from the treated oil-containing raw material, preferably downstream of the step of vacuum malaxing. The step of separating the oil from the treated oil-containing material may comprise using a centrifugal decanter, such as a two-phase or three-phase decanter, a hydraulic press, a sinolea method and/or vibrating filtration. Thereby, the high-quality oil may be separated in an online process, whereby the risk for oxidation will be decreased.

The method may further comprise the steps of re-milling the treated oil-containing raw material and separating the remaining phases, which preferably comprises centrifuging or separating by gravity. Thus, the present method additionally allows for re-milling, for example olive husk (pomace) coming from a first olive oil extraction into a second extraction to get extra oil (re-milling).

The oil-containing raw material may be plant-based, such as an oil-containing fruit or seed. According to an aspect, the fruit is an olive.

The objectives mentioned above, and the advantages described in connection with the method steps are also attained by a system for treating an oil-containing raw material according to the present invention as defined in the appended claims. The system may be adapted for performing the method steps above. The system comprises an arrangement for providing a substantially non-crushed oil-containing raw material to crushing arrangement. The crushing arrangement is associated with a pressure regulating device configured to reduce the pressure in the crushing arrangement below an atmospheric pressure. The crushing arrangement may be thus associated with an airtight vacuum vessel. The pressure during the crushing operation can be controlled anywhere in the range of atmospheric to deep vacuum, the deep vacuum range being 1 mmHg to 150 mmHg, preferably between 4 mm Hg and 95 mm Hg, more preferably between 20 mm Hg and 50 mm Hg.

The airtight vacuum vessel may be configured to expose the non-crushed oil-containing raw material to reduced pressures from below the atmospheric pressure to deep vacuum. The vacuum vessel is suitably associated with a pressure regulating device in communication with the airtight vacuum vessel for exposing the oil-containing raw material inside the airtight vessel to an absolute pressure of between 1 mmHg and 150 mmHg, and a temperature regulating device in communication with the airtight vacuum vessel for maintaining the temperature inside the airtight vessel between 0° C. and 45° C., preferably between 10° C. and 35° C., more preferably between 20° C. and 30° C.

The crushing arrangement may be arranged within or in fluid connection with the airtight vacuum vessel. Thus, the crushing arrangement may be located inside the vacuum vessel, upstream or downstream of the vacuum vessel.

The system may further comprise a separation equipment arranged downstream of the crushing arrangement configured to separate an oil from the paste.

Additionally, the system may further comprise an agitator inside the vacuum vessel configured to agitate the oil-containing raw material within the vacuum vessel.

The system may further comprise a storage vessel for the non-crushed oil-containing raw material upstream of the crushing arrangement and/or vacuum vessel. The storage vessel may also be an airtight vacuum storage vessel, which is configured to expose the non-crushed oil-containing plant-based raw material to vacuum. In this way, the exposure to vacuum to initiate evaporation from the raw material can be alternatively or additionally to another vacuum vessel be performed in the storage vessel.

The system may further comprise a condenser, which is fluidly connected to the vacuum vessel and located downstream of the vacuum vessel. In this way, the evaporated fluid may be collected and mixed with the treated raw material (paste) to ensure that flavors and nutrients from the condensate are utilized. The system may comprise a condensate accumulator in fluid connection with the condenser to ensure that the condensate can be mixed with the paste in a controlled manner.

The system may further comprise a paste surge tank upstream of the separation equipment. The surge tank may be located downstream of the mixing point of the vacuum malaxed paste and the condensate. Thus, a thoroughly mixed paste can be forwarded to separation operation.

The system may further comprise an air injector fluidly connected with the vacuum vessel.

The vacuum vessel may comprise a jacket configured to provide a part of a heat exchange surface. Thus, the raw material inside the vacuum vessel may be cooled in an efficient way.

Further features, advantages and objectives of the present invention are described in the following detailed description.

DETAILED DESCRIPTION

Figure 1:
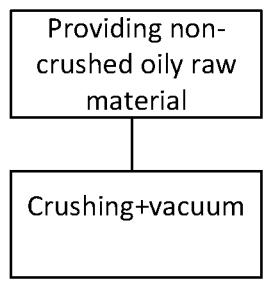
FIG. 1 shows schematically a flow chart of a method according to an aspect of the invention.

According to the present disclosure crushing under pressure-controlled atmosphere is used instead of a traditional crushing step. Additionally, a traditional malaxing step may be replaced by vacuum malaxing to provide a treated raw material which is in the form of a paste. The oil-containing raw material may be exposed to vacuum in a vacuum vessel, also referred to a vacuum extractor, which applies vacuum to extract water by evaporation or boiling from the oil-containing raw material.

By oil-containing raw material is in this application meant a biological raw material comprising oil- and water-containing cells. According to an embodiment, the oil-containing raw material may be animal-derived, i.e. comprising animal cells. According to another embodiment, the oil-containing raw material is plant-based, including for example oily fruits, cereal, seeds, nuts and legumes. Examples of suitable plant-based raw materials include, but are not limited to, olives, avocado, palm fruit, corn, rapeseed, sunflower seed and soybeans. According to an embodiment, the oil-containing raw material comprises or consists of olives.

By the inventive method, the partial oxygen pressure throughout a whole process of oil extraction may be controlled. In this way the physical properties of the raw material are changed in controlled atmosphere to provide a paste.

Additionally, during the vacuum malaxing, water is mainly extracted from the cellular tissue or pulp or intracellular juices of the raw material, which may be for example an oily fruit. Water evaporates carrying more or less amounts of entrained water droplets, depending on both the temperature and the strength or amount of vacuum applied in the extractor. Furthermore, air dissolved in the pulp will be stripped from the pulp. Without binding to any theory, the exceptional increased oil release noted is due to the softening and dissolution of the tissue of the oily fruit as water is extracted from within the cells of the oily fruit tissue.

In addition to the increased yield, the vacuum malaxing has the advantage of working with a controlled and reduced amount of oxygen, potentially essentially fully removed of atmospheric and dissolved oxygen, which prevents oxidation and considerably increases the oil shelf-life. This stage concludes the olive oil release from the raw material, which may be formed to paste under vacuum, which will then be separated in later stages, utilizing traditional methods.

Using centrifugal force, the solid phase can be separated from the liquid phase in a decanter or by any other suitable separation means. In an embodiment of the present invention, a two-phase or three-phase decanter may be used. Optionally, the phases could also be separated by using a press or any other suitable method. According to this embodiment, the impure oil may be subjected to a vibrating filter to eliminate coarse impurities as an effect.

During the discussion and disclosure of the present invention, following definitions apply:

Shoots: one-year-old twigs.

Oil mill: the facility or place where the oil is obtained from the olive.

Waste water: vegetation liquid and water released from the olive paste.

Olive cake: the solid part of the olives, i.e., a mixture of pit, skin, pulp and oil residues from which most of the oil was extracted.

Pomace: a by-product obtained by the continuous two-phase extraction system. It is a mixture of water and olive cake, which can also be used after a drying process, as fuel or even as compost.

Sieve: wire mesh with multiple perforations. In this invention, it may be made of stainless steel with round perforations of different diameters (1; 1.5 and 2 mm) with a cylindrical shape. Its function according to this invention is to produce cellular breakage.

Veraison status: the degree of ripeness of an olive consistent with the colour change of the epicarp.

Vegetation water: have the appearance of a brown watery residue liquid. The liquid has a pleasant odour but a bitter taste. This effluent, which has relatively high organic matter content, constitutes a source of pollution for the olive industry Pulp; paste or disaggregated cellular tissue: The grounded or mashed oily meat, containing mixture of crushed oily fruit, oil-in-water emulsions, and a great amount of air.

Holding; vacuum malaxing time: Time that the oily fruit paste is exposed to vacuum within the vacuum extractor (time retained within the vacuum extractor).

Oily fruit: Any kind of fruit that comprises oil that can be released from the fruit by processing. Examples of an oily fruit are olive, palm fruit and avocado.

Vacuum: As referred to within this publication, vacuum refers to applied pressure that is lower than lower than the surrounding atmospheric pressure.

Saturated water pressure: As referred to within this publication, saturated water pressure is the pure liquid water vapor pressure at a given temperature. When the system pressure is equal to the saturated water pressure at that given temperature the boiling point is reached and the liquid water changes (boils) into a vapor.

Simmering: As referred to within this publication, simmering is the system pressure above saturated water pressure at a given temperature, generating considerable vapors.

Vacuum extractor/oil extractor: An airtight vessel or container that is suitable for applying vacuum.

According to the present disclosure, the oil-containing raw material is suitably a plant-based raw material such as a fruits and/or seeds. The raw material is provided non-crushed to a vacuum vessel, in which it is treated to provide a paste. By non-crushed is meant that the raw material comprises unbroken oil- and water-containing cells, i.e. that the oil is contained within the plant cells before the treatment starts in the vacuum vessel. The present method combines two mechanisms for cell wall breakage: mechanical shear force and evaporation of water from the internal of the oil containing cells. The mechanical shear can take place either inside or outside the vacuum malaxing vessel. By the method, it is possible to provide a high yield of high-quality oil, e.g. extra virgin olive oil.

The raw material is suitably provided to the extraction facility in good sanitary condition and packed in proper containers. In general, systems for plant-based oil production are designed to ensure that the plants reach the mill free of dirt, so as to prevent machine wear and tear. The cleaning can be done in dry conditions or may be supplemented by washing the plants with water.

The operations for plant-based oil-containing raw material may include the following steps. Especially, the steps may be used in connection with oily fruits, such as olives.

Debranching is useful especially when there are shoots and branches together with the oil-containing plant-based raw material, such as olive. Continuous mechanical harvesting systems may have this operation integrated, or it may be incorporated in the oil production plant. The operation may be conducted using rollers over which the branches are transported. The fruits, such as olives, are smaller in diameter and may fall through a gap existing between these rolls.

In the next step, the leaves may be removed by for example aspiration or ventilation.

After the leaves and branches are removed, the oil-containing plant-based raw material may be washed. The washing may generally comprise two steps. In the first step, the olive is washed with constantly recirculating water. In the second step, the washed olive undergoes a final water spray rinse which completes the wash and allows for constant water renewal in the washer.

It is previously known to provide a paste of oily plant material before a step of malaxing. The purpose of the crushing operation is to break up tissues of the plant, where the oily matter is embedded, to provide a paste. Crushing involves processing of the plant by providing mechanical forces to break up the tissues. The mechanical forces are in this context understood to be forces provided by a crushing device or arrangement, which during crushing operation is arranged in a physical connection with the plants. By non-crushed, especially plant-based, raw material is thus in this connection meant raw material, which is oil-containing and has not been subjected to crushing and which has not been in physical connection with a crushing device. Thereby the non-crushed, especially plant-based, raw material comprises unbroken oil- and water-containing cells.

The crushing operation may be done by using several types of mills in the vacuum vessel or downstream or upstream of the vacuum malaxing vessel and outside the vacuum vessel. Examples of suitable mills are stone mills or metallic crushers, which are being associated with a pressure regulating device configured to reduce the pressure in the crushing arrangement below an atmospheric pressure. The stone mills may be, for example, either of a truncated conical or cylindrical shape. The metallic crushers may be for example hammer crushers. For example, the hammer crushers may comprise fixed or mobile hammers, 5 to 7 mm sieves, and may be configured to rotate at between 1800 and 2400 rpm. Other kind of crushers may be discs crushers where olives are crushed completely in a toothed disc crusher using a system that features a rotating disc acting against a stationary one. For example, olives fed into such a crusher are flung away from the centre, and crushed as they meet a toothed disc, powered by an electric motor. According to the present disclosure, the crushing operation may be performed inside a vacuum vessel, in which the oil-containing raw material is subjected to crushing to provide a paste, simultaneously with a step of exposing the raw material to vacuum. Alternatively, the crushing operation may be performed subsequently or before the step of vacuum malaxing. Mills as the crushing devices of the traditional type may have a drawback of incorporating a great amount of air into the plant pulp if the mills are rotating at high speed. High rotational speed may produce an oil-in-water emulsion and may leave mesocarp cellular tissue pieces of great size. Therefore, in addition to the reduce pressure, a smooth crushing operation is desirable. However, these problems are further decreased, when the crushing is performed inside a vacuum vessel, during the exposure to the deep vacuum. During crushing operation, some oil droplets may be released.

Depitting machines operate by a screw feed assembly that leads the oily plants, such as olives, into a special container fitted with bores. A rotating mixer moves the olives towards the periphery where the pulp is separated from the stone, which is ejected, unbroken and clean, at the end opposite to the feeding side. The pulp passes through the basket holes and drops into the hopper underneath. A screw then moves the product from the hopper to a pump that feeds the malaxing machine.

Grinding the plants, such as olives, may provide between 40-50% of the oil drops dispersed in the paste having a diameter higher than 30 μm. To achieve continuous phase separation, it is desirable that the diameter of the drops is greater than 30 μm (Khlif M., Rekik H., Arous N. (2003). La cadena continua en la extracción de aceite de oliva en Túnez: modalidades operativa. *Olivae*. 96:38-42). This correlates to the disclosure of Di Giovacchino, L. "Olive Oil Extraction by Pressing, Centrifugation and Percolation: Effect of Extraction Methods on Oil Yields", Olivae, vol. 36, p 14-30 (1991), that the smaller the oil drops' size, the higher their stability, making it more difficult for them to regroup into bigger drops.

The purpose of the traditional malaxing is to coalesce the dispersed and emulsified liquid oil droplets in the ground paste in related continuous phases, in order to facilitate and increase the solid-liquid separation in the following production operations. It also produces the laceration of the external cells in the whole tissue pieces left in the mill, releasing a percentage of the oil in the interior of cellular vacuoles. Normally, this is done at temperatures ranging from 25 to 30° C., favouring cellular breakage by enzymatic action. The walls and blades in the malaxer are usually made of stainless steel, and the malaxing should last long enough to obtain the highest percentage possible of free oil. Malaxing conditions may comprise a speed between 8 and 14 rpm at a temperature of 25 to 30° C. in the final paste, during 1 to 3 hours.

By the vacuum malaxing of the present invention, which preferably occurs at a deep vacuum of at an absolute pressure of between 1 mmHg and 150 mmHg, and a between 0° C. and 45° C., the malaxing time may be shortened, which is an advantage. In the known methods, the recently crushed/depitted olive paste does not have the optimal temperature to maximize coalescence of the released oil drops, wasting 50% of the time devoted to malaxing for the plant, such as olive, paste to reach the ideal temperature for the proper quality. This could cause malaxing time to be up to 2 hours, when the recommended time is 1 hour and even less than 50 minutes for 'Premium' quality Extra Virgin Olive Oils (EVOO). These malaxing times, combined with optimal temperatures and great air volumes incorporated into the paste in the mills produce the action of the peroxidase and polyphenoloxidase enzymes, therefore causing the paste oxidation and the reduction of the phenolic fraction of the oil. However, finer particles will still be present in the oil after this step and would be eliminated in later steps in the process, such as gravity precipitation or filtering.

To obtain an oil product, the solid and liquid phases need to be separated from an oily paste. For this purpose, pressing using hydraulic press has traditionally been the most widely used method. During pressing, a prepared paste is placed on thin layers on mats, which are placed on top of each other and then subjected to pressure. However, centrifugation has mostly replaced the pressing method. Centrifugation method causes mixed oily paste phases to separate into solid and liquid phase. This separation may be done in a decanter, also called horizontal centrifuges, having a rotor which spins at approximately 3,000 rpm.

A centrifuge system equipped with a decanter having three independent product outlets, the products separated during centrifugation and basically consisting of oil, waste water and olive cake, is called a three-phase or outlet system. This system uses added lukewarm water to the paste before it is fed into the decanter, so as to fluidize it and achieve a better separation of the liquid phases, oil, and waste water or vegetation water.

A system having a decanter with two independent product outlet, oil and pomace (olive cake plus vegetation water) is called a two-phase, or -outlet system. Unlike the three-phase system, this system does not use added water and it does not produce vegetation water. This system significantly reduces the effluent and the contaminant load in the oil production plants. Instead, a wet pomace is obtained, a solid by-product with a higher humidity degree.

A vibrating filter is an arrangement used to retain coarse particles that come with the oil at the decanter outlet. It has flat horizontal vibrating, slightly slanted, sifting sieves, where the oil passing through the sieve is collected.

A third method for separation of solid and liquid phase is so called Sinolea method. In this process, rows of metal discs or plates are dipped into the paste; the oil preferentially wets and sticks to the metal and is removed with scrapers in a continuous process. It is based on the different surface tension of the vegetation water and the oil, these different physical behaviors allowing the olive oil to adhere to a steel plaque while the other two phases remain behind. Sinolea works by continuously introducing several hundreds of steel plaques into the paste thus extracting the olive oil. If this process were not completely efficient, for example of a large quantity of oil is still left in the paste, the remaining paste may be further processed by another method, such as by means of industrial decanter.

The liquid phase separation can be done using different methods, among which are gravity separation and centrifugation. Gravity separation is an ancient separation method for oil and vegetation water, which is based on the different density between them. It is done by passing a paste through several interconnected vessels with continuous feed. Centrifugation is also based on the separation of the different phases (water and tissue remain left by the decanter) by their different densities, increasing gravity at a speed of 6500 rpm. This process may emulsify air into the oil, whereby it may affect its preservation by oxidation. The centrifugation process may leave suspended water and vegetable tissue traces that precipitate slowly by the action of gravity. To favour this action, the centrifugation product is left in storage at higher temperature and regular sediment purges are performed. The water and tissues contain dissolved sugars, which are the ideal substrate for fermentations that transfer undesirable flavours to the oils. To prevent this, different products may be used to increase precipitation. The oils get to storage with some humidity and impurities; these may precipitate, ferment, and imbue the oils with undesirable scents and flavours. Therefore, to allow for a proper purge, the tanks where the oils are stored may have a conical bottom.

The storage tank is the place where the filtered or unfiltered oil remains until its fractioning or transport, in general in stainless steel tanks. The storage tanks usually have isolating walls and ceilings against outer temperatures and do not transfer foreign flavours to the oils. Suitably the storage tanks also have a conditioning system to maintain a constant temperature of about 15-18° C., where odours are not produced, and which have low luminosity.

As mentioned previously, so far, no methods have been developed that allow controlling the partial oxygen pressure throughout the whole oil extraction process, whereby it is possible to obtain high yields of high-quality oils, e.g. olive oil, at a low temperature in a short time. To obtain olive oil in high yields using the previously known methods, the malaxing step must be extended to considerably over 1 hour if the temperature is kept low. Other solution for increase in oil yield is to raise the temperature to above 30° C. And for a significantly increased yield both the malaxing time and the temperature have to be changed. Both of those factors significantly deteriorate the quality of the oil. Additionally, for good oil yields, the current methods need to start from raw materials, such as olives, with adequate ripeness for the tissues to soften, and preferably also with low humidity.

The current invention, discloses the use of vacuum already when crushing the raw material and vacuum malaxing at low temperature for softening and damaging oil-containing cells, hence enhancing the release of oil. It has surprisingly been discovered that the use of vacuum at a low temperature, will not only inhibit the adverse effect of oxygen on the oil quality, but will substantially improve the oil yield over conventional methods, without negatively affecting the quality of the oil. What is more, the method disclosed in the current invention not only considerably increases the oil yield, it also improves the quality of the oil obtained.

The method or process disclosed in the current invention also allows for processing olives or other oil-containing raw materials, of different ripeness and softness and of different humidity degrees, without affecting the oil yield obtained. Furthermore, the current invention also eliminates the addition of extraction aids during the extraction process and prevents antioxidant destruction, reducing oxidative rancidity by eliminating the presence of oxygen during most of the process. The process or method disclosed also allows for processing olive husk (pomace) coming from first olive oil extraction into a second extraction to get extra oil (re-milling).

The present invention will now be further described with reference to the appended drawings. As shown in the examples of this invention, the method described herein allows to obtain high yield of high-quality olive oil.

Figure 2:
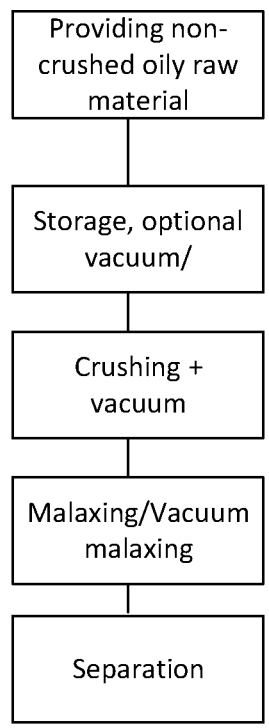
FIG. 2 shows schematically a flow chart of a method according to another aspect of the invention.

FIGS. 1 and 2 each illustrates schematically a flowchart showing principal steps of a method according to a respective variant of the present invention. Other variants may be possible as long as they fall within the scope of the appended claims. Accordingly, a non-crushed oil-containing raw material is provided. The non-crushed oil-containing raw material may be a plant-based material such as an oily fruit or seed and is not crushed by physical, contacting action and therefore comprises unbroken oil- and water-containing cells. The raw material may be provided directly to the process of crushing in reduced pressure (vacuum) as shown in FIG. 1. Alternatively, it may be intermediately stored for example in a storage vessel, as shown in FIG. 2. The storage vessel in FIG. 2 is located upstream of vacuum and crushing operations.

Generally, in the method, the non-crushed oil-containing raw material is treated by subjecting the oil-containing raw material to crushing at a reduced absolute pressure, which is below an atmospheric pressure, to provide a crushed oil-containing raw material. The crushed raw material may be exposed to traditional malaxing or vacuum malaxing as shown in FIG. 2. In vacuum malaxing the vacuum defines a deep vacuum with an absolute pressure of between 1 mm Hg and 150 mm Hg, and a temperature of between 0° C. and 45° C. The absolute pressure and temperature are adapted to cause release of oil, water vapor and flavours from the raw material as explained above. Thus, the method may comprise adapting the absolute pressure and temperature in the vacuum vessel to correspond to a ratio where the water in the oil- and water-containing cells starts to boil or simmer or keep the ratio within 50 mmHg of a saturated vapor pressure of the water in the in the oil- and water-containing cells. The method thus combines two mechanisms for cell wall breakage, i.e. mechanical shear force and evaporation of water from the internal of the oil containing cells. In this way, the oil- and water-containing cells are softened and/or damaged, hence enhancing the release of oil.

The mechanical shear needed for crushing can take place either inside or outside a vacuum vessel. The purpose of the crushing is to provide a paste, which comprises a liquid and solid phase that can be separated. The method may also comprise subjecting the oil-containing plant-based raw material to separation as shown in FIG. 2. Thus, a treated oil-containing plant-based raw material is provided after the vacuum exposure and the crushing operation, whereby an increased yield of oil with high quality can be obtained in the step of separation.

Figure 3:
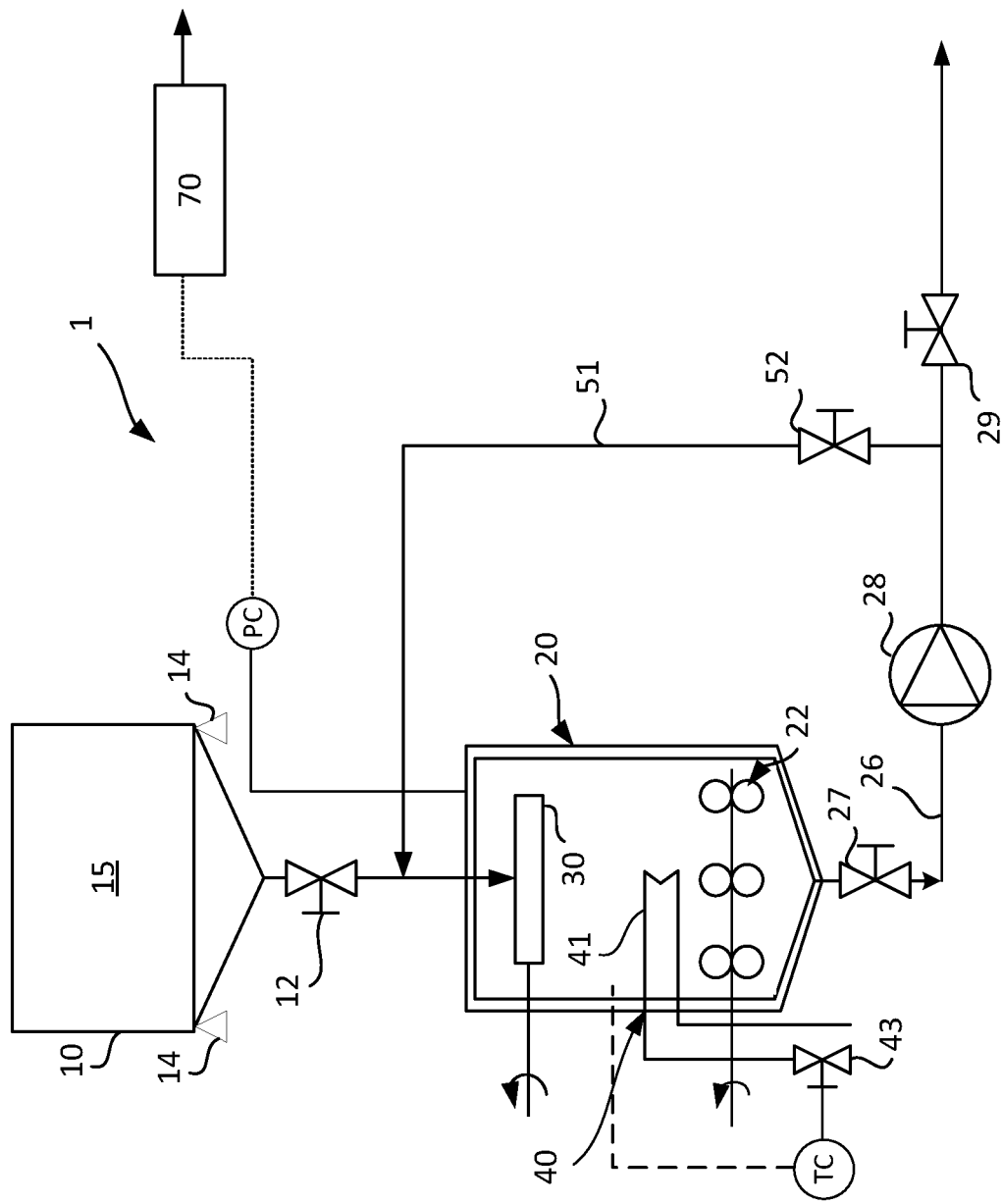
FIG. 3 shows schematically a coupling scheme of a system according to an example embodiment of the invention.
Figure 4:
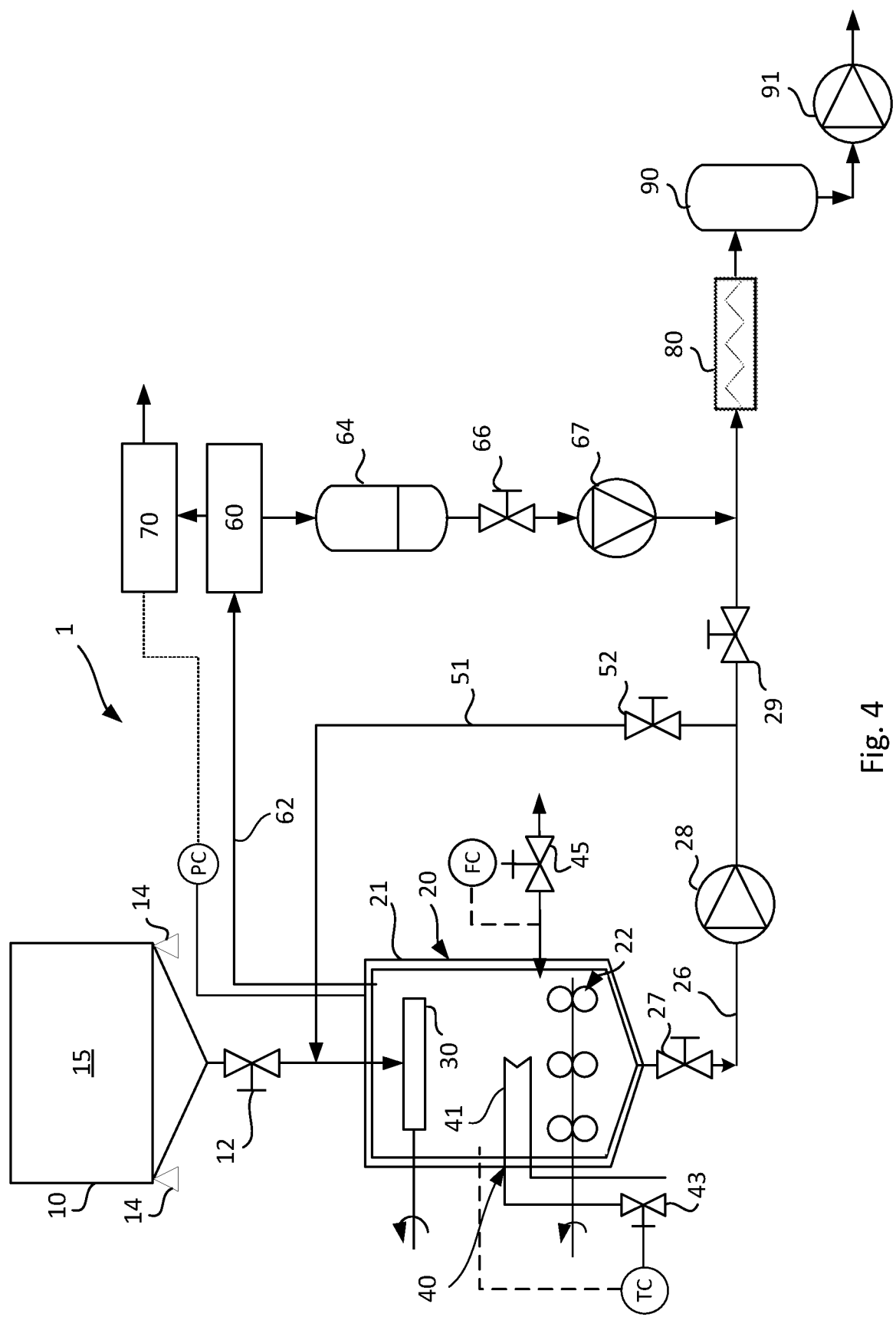
FIG. 4 shows schematically a coupling scheme of a system according to an example embodiment of the invention.

FIGS. 3 and 4 illustrate an example of a system coupling scheme according to the present invention. The system in FIG. 3 is shown without operations downstream of a vacuum vessel, but in FIG. 4 such operations are shown. Reference is equally made to both FIGS. 3 and 4, when describing common parts of the system. Thus, the system 1 comprises a storage vessel 10, which is filled with a batch of olives as an oil-containing raw material 15. The raw material could be other plant- or animal-based oil-containing raw material. The storage vessel 10 is positioned upstream of an airtight vacuum vessel 20. In the shown example, the storage vessel 10 is also positioned vertically above the vacuum vessel 20, whereby the oil-containing raw material can be fed to the vacuum vessel 20 by means of gravity when a feeding valve 12 between the storage and vacuum vessels 10, 20 is opened.

The vacuum vessel 20 comprises a mechanical crushing arrangement 30 and an agitator 22 and is configured such that the olives may be treated by vacuum and crushed inside the vacuum vessel sealed to the atmosphere. The vacuum vessel additionally comprises or is connected to a temperature regulating device 40, which may comprise a heat exchange device, including a heat conducting heating/cooling loop 41, to cool down the contents inside the vacuum vessel. The temperature regulating device 40 comprises a temperature controller TC, a temperature sensor (not shown) connected to the vacuum vessel 20 and a temperature controlling valve 43 or thermostat connected to the heating/cooling loop 41 providing a heat exchange surface. Additionally, the vacuum vessel 20 comprises a jacket 21, whereby the vacuum vessel wall 20 can be used as part of the heat exchange surface.

In an initial state of the process, both the storage vessel 10 and the vacuum vessel 20 are filled with air and at atmospheric pressure. According to a variant, it is however already at this point possible to begin applying a vacuum to adjust the oxygen partial pressure in both vessels anywhere between atmospheric and a deep pressure of 1 mmHg. Neither the agitator 22, the crushing arrangement 30 nor the temperature regulating device 40 is operating initially. The temperature regulating device 40 may be given a target setpoint temperature and the temperature of the vacuum vessel is brought to this temperature, typically in the range of 20-30° C. Additionally, a target vacuum absolute pressure below an atmospheric pressure is provided. The pressure may be varied during the treatment of the oil-containing material. When vacuum malaxing after the crushing operation, the absolute pressure and temperature in the vacuum vessel may correspond to a ratio where the water in oil- and water-containing cells starts to boil or simmer, or the ratio can be kept within 50 mmHg of a saturated vapor pressure of the water in the in the oil- and water-containing cells.

The system further comprises a pressure regulating device PC in communication with the airtight vacuum vessel 20 for exposing the oil-containing raw material inside the airtight vessel to the pressure below the atmospheric pressure. The pressure regulating device mau also be configured to regulate the pressure down to a deep vacuum, i.e. an absolute pressure of between 1 mmHg and 150 mmHg. The regulation from the atmospheric pressure down to deeper vacuum may be performed in a controlled pace.

The vacuum is controlled by a vacuum system comprising a pressure regulating device 70 in communication with the vacuum vessel 20. The vacuum vessel may be arranged in connection with a pressure controller PC comprising a pressure sensor (not shown) which may send a control signal to the pressure regulating or vacuum generating device 70. The pressure regulating device 70 may comprise e.g. a vacuum pump, to generate vacuum to a desired absolute pressure. The pressure regulating device 70 may be arranged in communication with the temperature regulating device 40.

Once the target temperature and the target absolute pressure are reached the crushing arrangement 30 is started and the feeding valve 12 opened to begin feed the olives 15 from the storage vessel 10 to the crushing arrangement 30. The vacuum vessel 20 is equipped with an agitation mechanism 22 that ensures the raw material is exposed to the vacuum, that the temperature is as even as possible and via additional shear force assist in continued breakup of the fruit.

While the raw material, for example olives, is/are crushed, there may during a short time be an almost adiabatic temperature increase in the crushed olives as the mechanical work in the crushing arrangement 30 is transformed to heat. However, as the paste leaves the crushing device 30 and drops to the bottom of the vacuum vessel 20, the temperature will quickly reach the temperature of the heat exchanger surfaces and after some time also be cooled by mixing with the paste already present in the bottom of the vacuum vessel 20. An additional temperature reduction will take place by water evaporation from the olives, depending on the pressure level in the vacuum vessel, converting the heat generated by the crushing to heat of evaporation. Water vapor will displace the air initially present in the vacuum vessel 20. However, there is a possibility to add air to the vacuum vessel for an optimum development of polyphenols and other oxygenated compounds and their breakdown products contributing to an increased olive oil quality. FIG. 4 shows that the vacuum vessel 20 may additionally be connected to a fluid flow regulating device FC comprising a fluid controlling valve 45.

This operation continues until the storage vessel 10 with olives 15 is empty.

The weight of the storage vessel 10 can for example be followed using load cells 14, whereby it can be evaluated when the storage vessel 10 is empty. When the storage vessel 10 is empty, it will be isolated from the vacuum vessel by closing the feeding valve 12. While the charge of olives is being treated in the vacuum vessel 20, the storage vessel 10 can be filled with a next charge of olives 15.

Unlike the traditional processes where malaxing is a once-through process, there is in principle with the present method a possibility to have the paste pass the crushing arrangement 30 several times for an even more finely divided fruit and finer paste. Therefore, a return circuit is arranged downstream of the vacuum vessel 20. In the shown arrangement the bottom of the vacuum vessel 20 is connected to an outlet line 26 comprising an outlet valve 27, which can be opened to feed the paste from the vacuum vessel to operations downstream of the vacuum vessel. A feeding pump 28 is provided in the outlet line to assist in feeding of the paste. A return line 51 is connected to the outlet line 26 downstream of the feeding pump 28. When it is desirable to return the paste to the vacuum vessel 20, a return valve 52 is opened and a second feeding valve 29 arranged downstream of the connecting point for the return line 51 is closed, so that the paste is directed to the return line 51 and consequently back to the vacuum vessel 20. Once the desired degree of crushing has been reached the crushing operation will be stopped, the return valve closed 52 and the second feed valve 29 opened. It is possible that the vacuum malaxing follows an optimized timed program using the following key operating parameters, which may be set to vary with time, i.e. temperature, oxygen partial pressure and agitation speed. The valves, crushing devices, agitators and the vacuum can be automatically controlled, or they may be manually controlled.

The temperature control takes place via two mechanisms. One being an indirect temperature control via the built-in heat exchange surfaces. The other, which provides a cooling effect, is by evaporation of water from the paste, as the vacuum in the vessel approaches the 20-40 mm Hg absolute pressure, in which the boiling point of water is in the 20-30° C. range. The heat of evaporation of water at 25° C. is about 584 kcal/kg and for example evaporating 10% of the water in 1 kg of paste (with 55% water) would lead to an adiabatic temperature decrease of 584 kcal/kg water*0.55 kg water/kg paste*0.1/1 (kcal/kg paste/° C.)=32° C. (assuming a specific heat capacity of the paste of 1 kcal/kg/° C.). As the water exporates in a controlled manner from the water rich (70-75%) mesocarb of the olives, the cells undergo stress that will further assist tearing up the cell walls and liberate the oil inside the cells.

Reference is now made to FIG. 4. During the operation, condensate from the vacuum vessel is collected via a condenser line 62 to a condenser 60, from which the condensate is accumulated to a condensate accumulator 64. The condenser is connected to the vacuum system comprising the pressure regulating device 70, from which fluids may be vented. The condensate may comprise substances that are valuable for the quality of the oil, and therefore, the condensate can be mixed with the paste flow in the outlet line 26, which is fed from the vacuum vessel 20. The condensate may be fed from the accumulator 64 by opening a third feeding valve 66 and by pumping the condensate by means of a second feeding pump 67 downstream of the condensate accumulator 64 together with the paste from vacuum malaxing to a vacuum malaxed paste surge tank 90 via an inline mixer 80. After a predetermined time, the vacuum malaxing ends. At this point the vacuum vessel 20 with the malaxed paste and the condensate accumulator 64 with the condensate are emptied. The emptying can be timed such that they are empty about the same time. The paste and condensate are arranged to pass through the inline mixer 80, whereby they are intimately mixed before being fed to the malaxed paste surge tank 90. From this surge tank 90 the paste can be fed by means of a third feeding pump 91 continuously to a downstream separation equipment (not shown), which may be for example a decanter separator, high speed separator, etc.

Figure 5:
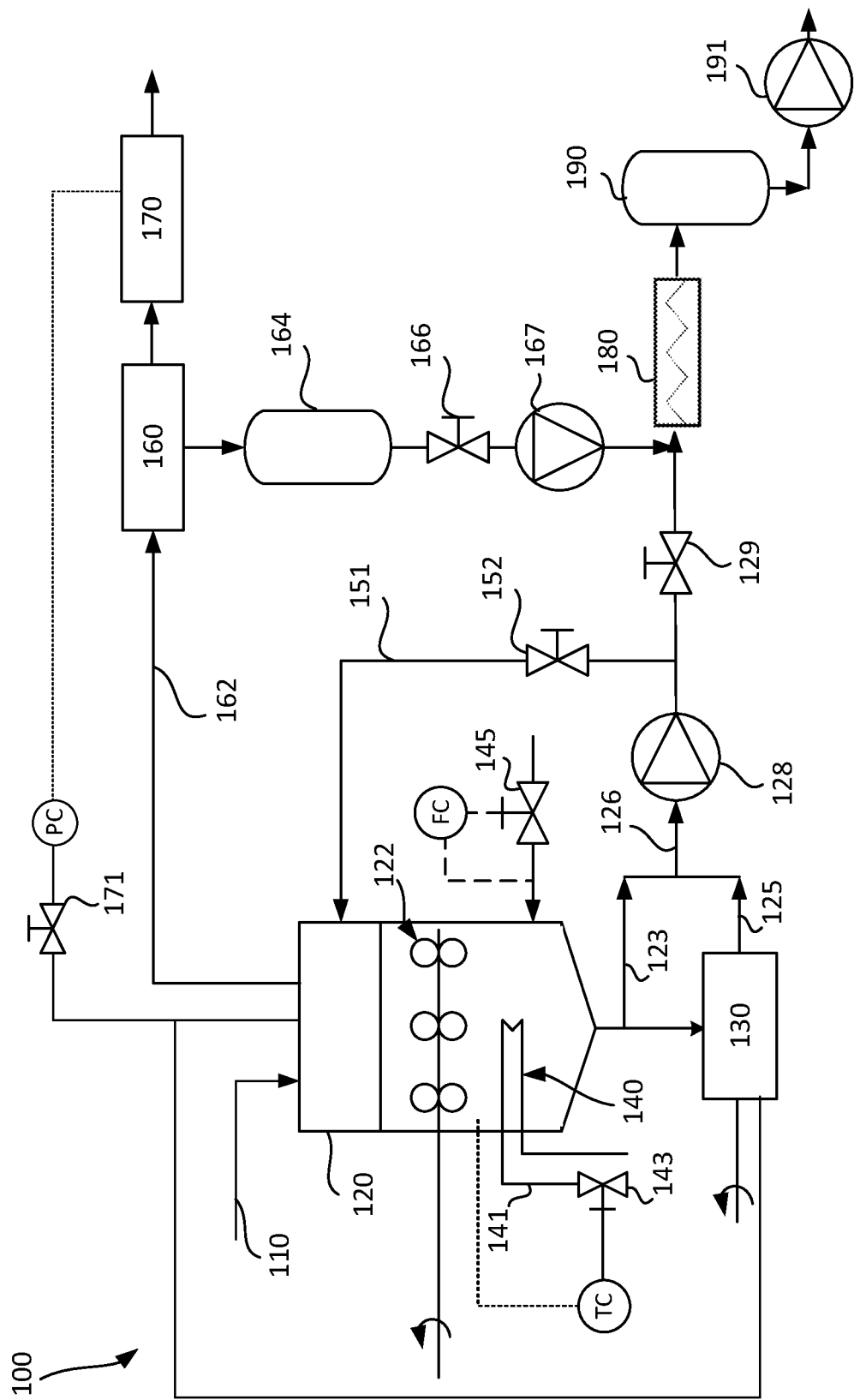
FIG. 5 shows schematically a coupling scheme of a system according to another example embodiment of the invention.

In FIG. 5, another embodiment of a suitable system 100 for the present method is shown in a process coupling scheme. The main difference between the system 1 in FIG. 4 and the system 100 in FIG. 5 is that the crushing operation is performed downstream of the vacuum vessel 120, i.e. subsequently to the vacuum exposure of the oily raw material.

The system 100 in FIG. 5 comprises a feeding arrangement comprising a feeding line 110, which is configured to feed substantially non-crushed oil-containing plant-based raw material to an airtight vacuum vessel 120. The raw material could be plant- or animal-based oil-containing raw material, for example olives.

The vacuum vessel 120 comprises an agitator 122 and is configured such that the olives may be treated by vacuum sealed to the atmosphere. The vacuum vessel additionally comprises or is connected to a temperature regulating device 140, which may comprise a heat exchange device, including a heat conducting heating/cooling loop 141, to cool down the contents inside the vacuum vessel 120. The temperature regulating device 140 comprises a temperature controller TC, comprising a temperature sensor connected to the vacuum vessel 120 and a temperature controlling valve 143 or thermostat connected to the heating/cooling loop 141 providing a heat exchange surface. In a similar manner as in FIG. 4, the vacuum vessel may comprise a jacket, whereby the vacuum vessel wall can be used as part of the heat exchange surface.

In an initial state of the process and when a batch of olives has been provided to the vacuum vessel, a vacuum is generated. Simultaneously, the temperature regulating device 140 may be given a target setpoint temperature and the temperature of the vacuum vessel 120 is brought to this temperature, typically in the range of 20-30° C. Additionally, a target vacuum absolute pressure below the atmospheric pressure is provided. The absolute pressure and temperature in the vacuum vessel may be chosen to correspond to a ratio where the water in oil- and water-containing cells starts to boil or simmer or keep the ratio within 50 mmHg of a saturated vapor pressure of the water in the in the oil- and water-containing cells.

The agitator 122 has a purpose of mixing the olives inside the vacuum vessel to ensure that all olives are exposed to vacuum. Without agitation, there is a risk that only olives of the top surface are exposed to vacuum. This vacuum exposure may take from 20 minutes to 3 hours.

In the shown embodiment, the crushing arrangement 130 is arranged downstream of the vacuum vessel 120 but is fluidly connected to the vacuum vessel. The pressure in the crushing arrangement may therefore be controlled by the same vacuum system 170 as the vacuum in the vacuum vessel 120. Thus, the olives may be exposed to vacuum inside the vacuum vessel for a desired time, and subsequently passed to the crushing arrangement 130. During the agitation, the temperature inside the vacuum vessel 120 may rise. In a similar manner as in connection with FIG. 4, the system 100 comprises a pressure regulating device 170 in communication with the vacuum vessel 120. The vacuum vessel may additionally be connected to a flow controlling valve 145, which is regulated by a flow controller FC. There is also a possibility to add air via the pressure regulating device to the vacuum vessel for an optimum development of polyphenols and other oxygenated compounds and their breakdown products contributing to an increased olive oil quality.

Also, in the embodiment of FIG. 5, a return circuit is arranged downstream of the vacuum vessel 120, but in the shown embodiment, the crushing arrangement 130 is located between the vacuum vessel and a feeding pump 128. In the shown arrangement the feeding pump 128 is arranged in an outlet line 126 connected with an outlet line 125 from the crushing arrangement 130 and a crushing arrangement by-pass line 123. A return line 151 is connected to the outlet line 126 downstream of the feeding pump 128. When it is desirable to return the paste to the vacuum vessel 120, the return valve 152 is opened and a second feeding valve 129 arranged downstream of a connecting point for the return line 151 is closed, so that the paste is directed to the return line 151 and consequently back to the vacuum vessel 120, in a similar way as described in FIG. 4. Once the desired degree of crushing has been reached the crushing operation will be stopped, the return valve closed 152 and the second feed valve 129 opened.

During the operation, condensate from the vacuum vessel 120 is collected via a condenser line 162 to a condenser 160, from which the condensate is accumulated to a condensate accumulator 164. The condenser is connected to a vacuum system comprising a vacuum generating means 170, such as a vacuum pump or steam ejectors. The vacuum system may further comprise a pressure controller PC, which may be connected to a pressure sensor (not shown) in connection with the inside of the vacuum vessel 120 and/or the crushing arrangement 130 and to a pressure regulating valve 171, which may be manual or automated. The condensate can be mixed with the paste by opening a third feeding valve 166 and thereby allow the condensate to be mixed with the paste flow in the outlet line 126. The mixing and subsequent operations including separation may be performed in accordance with the operations described above in connection with FIG. 4, i.e. the paste and condensate may be arranged to pass through an inline mixer 180, whereby they are intimately mixed before being fed to a malaxed paste surge tank 190. From this surge tank 190 the paste can be fed by means of a third feeding pump 191 continuously to a downstream separation equipment (not shown), which may be for example a decanter separator, high speed separator, etc.

According to further embodiment, the oily raw material may be processed in a continuous manner in two or more vacuum vessels and/or crushing arrangements arranged in series in fluid connection with each other. Alternatively or additionally, the surge tank may be dimensioned such that a continuous stream of treated paste can be provided for the downstream operations including e.g. separation. The construction details of the system can be varied within the scope of the appended claims.

Accordingly, the method of the current invention may utilize a vacuum for controlling the partial oxygen pressure throughout a whole oil extraction process and additionally for partly evaporating water from an oily raw material by lowering the system pressure at the raw material surface to or close to the saturated water vapor pressure at a given temperature.

Figure 6:
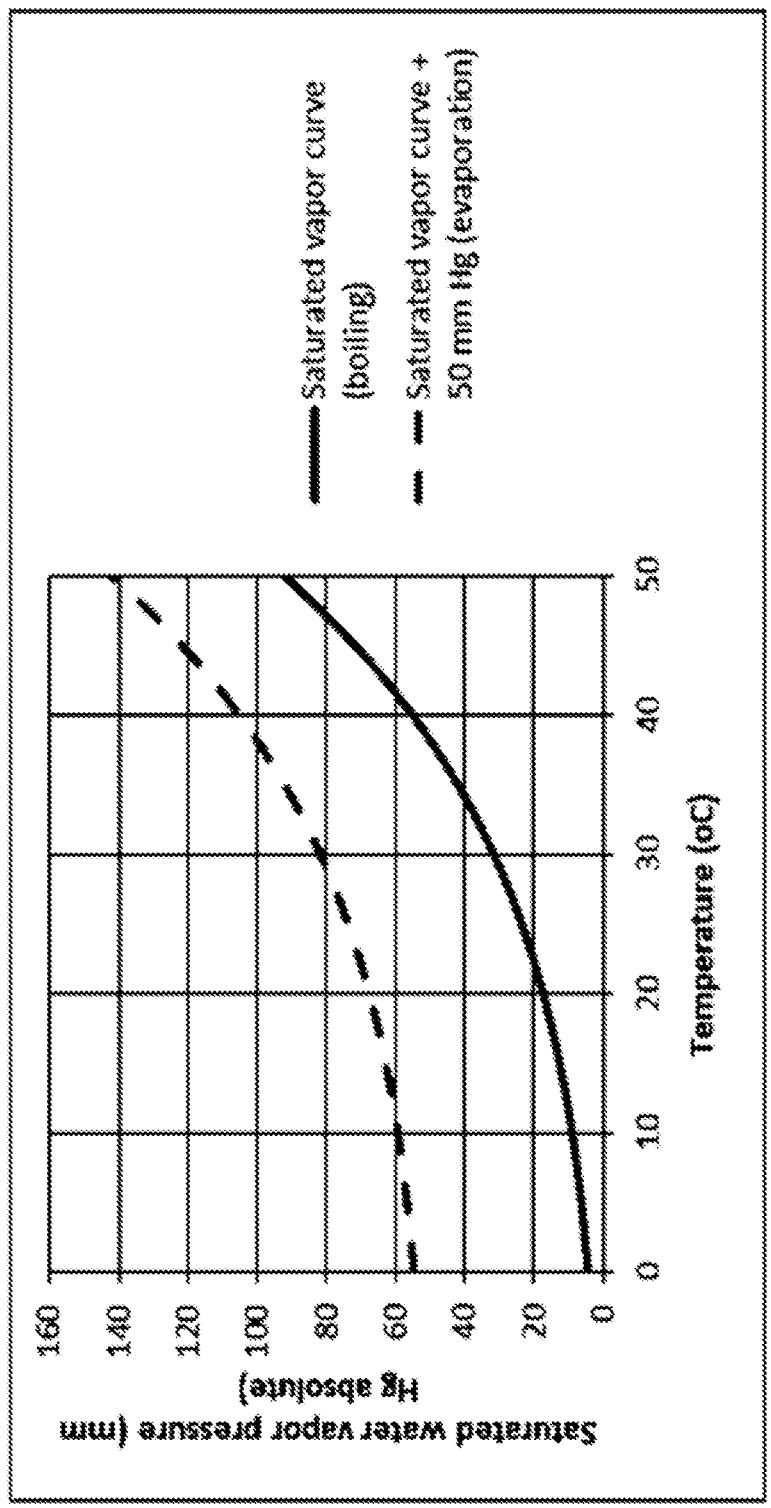
FIG. 6 shows a graph demonstrating the relationship between water evaporation, temperature and pressure.

The temperature range during a vacuum malaxing may be from 0° C., corresponding to pressure of 4.6 mm Hg absolute, to 50° C., corresponding to 92.5 mm Hg absolute. See Table 1 below. However, as water starts to evaporate long before it reaches its boiling point, the current invention will work over wider range of vacuum and temperature. This range is demonstrated in FIG. 6, by the solid line representing the pressure where water is at its boiling temperature and pressure, and the dashed line representing the boiling pressure+50 mm Hg at a given temperature where a significant amount of evaporation would be observed. The current invention can be utilized within the whole range between the full and the dashed line of FIG. 6.

A preferred temperature interval for the vacuum malaxing/extraction of the present invention is from 0° C. (where the water will boil at a pressure of 4.6 mm Hg absolute and significant water evaporation starts at a pressure of around 54.6 mm Hg absolute) or (10° C. (where the water will boil at a pressure of 9.2 mm Hg absolute and significant water evaporation starts at a pressure of around 59.2 mm Hg absolute) to 45° C. (where water will boil at pressure of 71.9 mm Hg absolute and significant water evaporation will starts at around pressure of 121.9 mm Hg absolute). Depending on the type and thereby the nature of the oily raw material there will be a more preferred temperature range. For olives the preferred range would be in the range of 0° C. (where water boils at pressure of 4.6 mm Hg absolute and significant water evaporation will starts at around pressure of 54.6 mm Hg absolute) and 35° C. (where water will boil at a pressure of 42.2 mm Hg absolute), preferably between 15° C. (where water will boil at a pressure of 12.8 mm Hg) and 30° C. (where water will boil at a pressure of 31.8 mm Hg absolute and significant water evaporation will starts at around pressure of 81.8 mm Hg absolute), more preferably between 18° C. (where water will boil at a pressure of 15.5 mm Hg absolute and significant water evaporation will starts at around pressure of 65 mm Hg absolute) and 27° C. (where water will boil at a pressure of 26.7 mm Hg absolute and significant water evaporation will starts at around pressure of 76.7 mm Hg absolute), even more preferably between 20° C. (where water will boil at a pressure of 17 mm Hg absolute and significant water evaporation will starts at around pressure of 67.5 mm Hg absolute) and 27° C. where water will boil at a pressure of 26.7 mm Hg absolute and significant water evaporation will starts at around pressure of 76.7 mm Hg absolute) and most preferably between 22° C. (where water will boil at a pressure of 19.8 mm Hg and significant water evaporation will starts at around pressure of 69.8 mm Hg absolute) and 26° C. (where water will boil at a pressure of 25.2 mm Hg and significant water evaporation will start at around pressure of 75.2 mm Hg absolute). The preferred temperature and pressure range for other oily fruits will depend on the oily fruit and the temperature that the oil will tolerate during processing. See Table 1 below that demonstrates the relationship between water evaporation pressure and temperature.

TABLE 1

The relationship between water evaporation, temperature and pressure.

| Temp (° C.) | Pressure (mm Hg) | |
|---|---|---|
| | Saturated water (boiling) | Saturated water + 50 mmHg (evaporation of water) |
| 0 | 4.6 | 54.6 |
| 1 | 4.9 | 54.9 |
| 2 | 5.3 | 55.3 |
| 3 | 5.7 | 55.7 |
| 4 | 6.1 | 56.1 |
| 5 | 6.5 | 56.5 |
| 6 | 7 | 57 |
| 7 | 7.5 | 57.5 |
| 8 | 8 | 58 |
| 9 | 8.6 | 58.6 |
| 10 | 9.2 | 59.2 |
| 11 | 9.8 | 59.8 |
| 12 | 10.5 | 60.5 |
| 13 | 11.2 | 61.2 |
| 14 | 12 | 62 |
| 15 | 12.8 | 62.8 |
| 16 | 13.6 | 63.6 |
| 17 | 14.5 | 64.5 |
| 18 | 15.5 | 65.5 |
| 19 | 16.5 | 66.5 |
| 20 | 17.5 | 67.5 |
| 21 | 18.7 | 68.7 |
| 22 | 19.8 | 69.8 |
| 23 | 21.1 | 71.1 |
| 24 | 22.4 | 72.4 |
| 25 | 23.8 | 73.8 |
| 26 | 25.2 | 75.2 |
| 27 | 26.7 | 76.7 |
| 28 | 28.3 | 78.3 |
| 29 | 30 | 80 |
| 30 | 31.8 | 81.8 |
| 31 | 33.7 | 83.7 |
| 32 | 35.7 | 85.7 |
| 33 | 37.7 | 87.7 |
| 34 | 39.9 | 89.9 |
| 35 | 42.2 | 92.2 |
| 36 | 44.6 | 94.6 |
| 37 | 47.1 | 97.1 |
| 38 | 49.7 | 99.7 |
| 39 | 52.4 | 102.4 |
| 40 | 55.3 | 105.3 |
| 41 | 58.3 | 108.3 |
| 42 | 61.5 | 111.5 |
| 43 | 64.8 | 114.8 |
| 44 | 68.3 | 118.3 |
| 45 | 71.9 | 121.9 |
| 46 | 75.7 | 125.7 |
| 47 | 79.6 | 129.6 |
| 48 | 83.7 | 133.7 |
| 49 | 88 | 138 |
| 50 | 92.5 | 142.5 |

In one embodiment of this invention, a high-quality olive oil extraction method is provided, with improved yields as compared to the methods currently in use. In an embodiment of this invention, the clean olives are grounded in vacuum using a traditional hammer crusher rotating at 2400 rpm with a sieve of approximately 5 mm. As a result of this process, an olive paste is obtained consisting of 1.5-3.5% epicarp (skin), 70-80% mesocarp (pulp), 15-28% endocarp (pit), 2-4% seed (nut) and oil-in-water emulsions.

In an additional embodiment of this invention, when exiting the crushing operation, the ground olives may go through a sift. This sift has rotating blades working at a speed of 800 rpm and has sieves with round orifices the diameter of which may vary from 1 to 4 mm. The action of the sift causes the almost total breakage of the tissues, exposing the cells containing oil in their interior to the ensuing processes done in the extractor of this invention. Through the center of the sift, the blades push the ligneous endocarp pieces (pit) towards the end opposite to the paste input. Also, the mesocarp (containing most of the oil) is pushed by the rotating blades through the round orifices of the sift, producing the mechanical breakage of the tissues. In one embodiment of this invention, the products obtained from the sifting process are mixed in a horizontal blade vessel to homogenize them. In another embodiment of this invention, the mixing process of the products obtained in the sifting process is avoided by using a high yield sift, thus increasing the production capacity. A higher yield sift means a sift able to process the amount of paste necessary to feed the decanter or other suitable separation means and which extracts all the pulp from the olive. This is done with several superimposed sifts which reprocess the endocarp. In yet another embodiment, the cellular tissue disaggregation, or homogenization, is done by using a grinder to grind the olive in smaller fractions or by using a conventional crusher.

In a further embodiment of this invention, the olive paste is obtained by any of the cellular tissue disaggregation methods mentioned, simultaneously or subsequent to vacuum exposure. Any other method allowing for olive tissue disaggregation into smaller fractions can be used. The purpose of the vacuum step is to extract the oil from inside the raw material by applying vacuum inside the extractor. In an embodiment of this invention, mixing and recirculating the raw material inside the extractor is performed. The surface-to-volume ratio of the oily fruit paste can also be altered, by designs of the vacuum extractor. Larger paste surface will expose more of the paste to the vacuum at the surface, resulting in more effective and faster evaporation of water from the paste and correspondingly more release of oil within the paste.

In one embodiment of the present invention the airtight vessel of the vacuum vessel or extractor has a cylindrical shape; wherein the diameter-length ratio is between 1:2 and 1:5, preferably between 1:2 and 1:4, even more preferably 1:3, the vessel preferably having a vertical orientation. A horizontal orientation may be conceivable.

One aspect of this embodiment is based on the hypothesis or assumption that the oil-containing non-crushed raw material exposure to vacuum will induce a fast breakage of the emulsions generated in the crushing or depitting process, producing a great amount of free oil. One hypothesis is that this could reduce the action of lipases (hydrolysis produced in the oil-water interface breaking the triglycerides into partial glycerides and free fatty acids). Possible assumption is that this could happen without affecting the possible synergy between the esterase and the β-glucosidase or with limited effect on the possible synergy between the esterase and the β-glucosidase. Both enzymes are very important to transform phenolic molecules of fruit into aglycons and simplest phenolic compounds which are migrated to oil with increase of antioxidant and, consequently, shelf life. On the contrary, by inhibiting the action of the polyphenoloxidase and the peroxidase due to the absence of oxygen, the assumption is that a greater amount of antioxidants present in the oil is preserved, as compared to traditional systems. Consequently, this invention provides the ideal conditions to obtain an excellent quality olive oil.

The vacuum applied during the vacuum malaxing in the vacuum vessel is assumed to have multiple beneficial effects, that together with crushing in reduced pressure could explain the increased oil released from the paste provided by the vacuum malaxing, while simultaneously producing a superior oil quality, among them:

- It is assumed that it extracts intracellular fluids, composed by oil and vegetation water, through vacuole breakage. Because the tissue pieces are small, almost all the oil is released.
- It is also assumed that the evaporation of water will happen at intercellular level within the oily fruit tissue within the paste, resulting in a softer degreased oily fruit tissue and grossly increased release of oil.
- It works in the absence of oxygen, which prevents oxidation thus preserving the antioxidants present in the oil and considerably increases its shelf-life and nutritional benefits
- It allows processing olives with different hydration degrees without affecting yield.
- It allows processing olives with different ripeness degrees without affecting yield, regarding total fat for example in the olives.
- It eliminates the use of any kind of adjuvant like talc or kaolinite.

In an embodiment of this invention, a steam jet is used during the extractor when breaking the vacuum and when draining to avoid displacing the paste with air which could cause small surface oxidations in it. Additionally, the steam jet favors cleaning the extractor surface, preventing adherence of the paste to such surface.

In another embodiment of this invention, an inert gas injection is used during the extractor when breaking the vacuum and when draining to prevent oxygen from fixing to the paste when air enters as the vacuum is broken.

The total time for the paste to remain inside the extractor depends on a number of factors such as the vacuum pump capacity, the paste surface exposure to the vacuum action (recirculation speed, in some of the embodiments), and in case of olives, the mesocarp particle size (the smaller the particles, the less time they will remain in the vacuum). In turn, the particle size depends on the mesocarp consistency, which is determined by the olive ripeness degree and the methods used to disaggregate the cellular tissue. The end of the extraction may be determined by significant reduction or absence of bubbling in the paste. In an embodiment of this invention, determination of bubbling absence is done visually.

Cellular tissue disaggregation by sifting is a complement which increases the efficiency of the extractor. The use of other methods would cause for the paste to remain inside the extractor longer to complete the extraction.

The non-crushed raw material which is formed into paste, and which are processed in the extractor of this invention present a great amount of free oil and may be separated by a two- or three-phase decanter or by pressing. In a preferred embodiment of this invention, a two-phase decanter is used. Then the impure olive oil is subject to the effects of a vibrating filter to eliminate the coarse impurities. Then, water and tissue traces are eliminated by centrifuging the product from the previous step. It is worth mentioning that, even when this step is finished, there will be impurities (both solid and liquid) in the oil which will have to be eliminated by other methods, such as gravity precipitation or filtering.

The main advantages of the extraction method of this invention are a direct consequence of the use of vacuum and the intracellular oil extraction by the suction that it causes.

In a particular embodiment of this invention, an olive oil extraction device is used. It comprises a sealed vessel with a diameter-length ratio of approximately 1:2, 1:3, or higher, as long as the cost-benefit ratio is respected. The extractor has between two and three circular exchanger liners where water circulates, or may have any other heat exchanger, not only in shape but also in quantity. In another embodiment, the extractor may lack the heat exchanger if the temperature is achieved by a method prior to entering the extractor or by room temperature. The extractor may also have a vertical stirrer comprising a central shaft with branches and vertical extensions which, in the two first spaces between the circular liners, have steel scraping blades with ends made of Teflon or other materials which do not contaminate the paste or wear the liners. Said scraping blades stir the oil-containing paste towards the base of the extractor. In the central ring circle hollow formed by the first circular liner and attached to the stirrer central shaft there is an auger which moves the paste up to recirculate it. The stirrer rotates within a speed range of approximately 40-60 rpm or greater in order to ensure that the vacuum comes in contact with all the paste surface. This paste mixing, and recirculating is done continuously until the most oil can be extracted from inside the paste. In another embodiment of this invention, the extractor has a flavour retriever refrigerated at a low temperature of approximately 4° C., and the condensed flavours are added to the paste just before draining the extractor.

In another embodiment, the paste recirculation inside the extractor can be done using any mechanical method which allows the paste to be exposed to the action of the vacuum. A non-limiting example is using a pump as an alternative or complement together with the auger.

In different embodiments of the current invention, an optimal combination of oil yield and oil quality will depend on the temperature applied, the vacuum applied, and the time spent during the malaxing/vacuum extracting step. A person skilled in the art will know that those variables can be altered for optimal result as disclosed in publications such as Di Giovacchino, L. "Olive Oil Extraction by Pressing, Centrifugation and Percolation: Effect of Extraction Methods on Oil Yields", Olivae, vol. 36, p 14-30 (1991)

The malaxing time may be between 10-60 min, more preferably between 10-45 min, such as preferably between 20-40 min, more preferred between 25-35 min and even more preferred around 25 or 30 min. The temperature applied in different embodiments of the current invention may suitably vary from 22-35° C., preferably between 24-27° C., more preferably between 25-26° C.

As demonstrated in Table 1, above the absolute pressure applied will be a function of the temperature applied. The vacuum applied will range between 1 mm Hg absolute and 150 mm Hg absolute. In one embodiment of the invention, with the temperature applied at 22° C. the pressure applied will between 19.8-69.8 mm Hg absolute. In another embodiment of the invention with the temperature applied at 24° C. the pressure applied will between 22.4-72.4 mm Hg absolute. In yet another embodiment of the invention with the temperature applied at 25° C. the pressure applied will between 23.8-73.8 mm Hg absolute. In another embodiment of the invention with the temperature applied at 26° C. the pressure applied will between 25.2-75.2 mm Hg absolute. In yet another embodiment of the invention with the temperature applied at 27° C. the pressure applied will between 26.7-76.7 mm Hg absolute. In another embodiment of the invention with the temperature applied at 30° C. the pressure applied will between 31.8-81.8 mm Hg absolute and in yet another embodiment of the invention with the temperature applied at 35° C. the pressure applied will between 42.2-92.2 mm Hg absolute.

In one embodiment of the present invention the oily raw material is exposed to vacuum extraction and thereafter the solid part of the paste is separated from the liquid, with suitable separation methods (such as centrifugation in a decanter). Thereafter the solid are again exposed to a vacuum according to the invention, for a second milling or second malaxing, where after the solids and liquids are separated again.

The invention is not limited to the embodiments described above and shown in the drawings but can be supplemented and modified in any manner within the scope of the invention as defined by the enclosed claims.

The invention claimed is:

1. A method of treating an oil-containing raw material comprising:
providing a non-crushed oil-containing raw material,
subjecting the oil-containing raw material to crushing at a reduced absolute pressure, which is below an atmospheric pressure, to provide a crushed oil-containing raw material, the reduced absolute pressure being between 1 mm Hg and 150 mm Hg.

2. The method according to claim 1, wherein the reduced absolute pressure is between 20 mm Hg and 50 mm Hg.

3. The method according to claim 1, wherein the method comprises keeping the temperature during the crushing at the reduced absolute pressure between 0° C. and 45° C.

4. The method according to claim 1, wherein the method comprises vacuum malaxing by exposing the non-crushed or crushed oil-containing raw material to a deep vacuum, wherein the deep vacuum defines an absolute pressure of between 1 mm Hg and 150 mm Hg, and a temperature of between 0° C. and 45° C.

5. The method according to claim 1, wherein the method comprises adapting the absolute pressure and temperature in the vacuum malaxing step and/or crushing step to correspond to a ratio where the water in oil- and water-containing cells starts to boil or simmer, or keep the ratio within 50 mm Hg of a saturated vapor pressure of the water in the in the oil- and water-containing cells.

6. The method according to claim 4, wherein the method comprises adapting the absolute pressure of the deep vacuum between 4 mm Hg and 95 mm Hg.

7. The method according to claim 4, wherein the vacuum malaxing is performed before, simultaneously with or subsequent to the crushing of the oil-containing raw material.

8. The method according to claim 4, wherein the vacuum malaxing is performed between 10 minutes and 60 minutes.

9. The method according to claim 4, wherein the method comprises repeating the crushing of the oil-containing raw material and/or vacuum malaxing.

10. The method according to claim 4, wherein the method comprises a separating an oil from the treated oil-containing raw material.

11. The method according to claim 1, wherein the method comprises agitating the oil-containing raw material during exposure to the vacuum.

12. The method according to claim 1, wherein the oil-containing raw material is plant-based.

13. A method of treating an oil-containing raw material comprising:
   providing a non-crushed oil-containing raw material;
   subjecting the oil-containing raw material to crushing at a reduced absolute pressure, which is below an atmospheric pressure, to provide a crushed oil-containing raw material, the reduced absolute pressure being between 4 mm Hg and 95 mm Hg; and
   maintaining a temperature between 0° C. and 45° C. during the crushing at the reduced absolute pressure.

14. The method according to claim 13, wherein the subjecting of the oil-containing raw material to crushing at the reduced absolute pressure occurs in a vacuum vessel, the vacuum vessel being connected to an outlet line into which flows a paste from the vacuum vessel, the method further comprising returning at least a portion of the paste in the outlet line to the vacuum vessel.

15. The method according to claim 13, further comprising vacuum malaxing the non-crushed or crushed oil-containing raw material by exposing the non-crushed or crushed oil-containing raw material to an absolute pressure between 1 mm Hg and 150 mm Hg, and a temperature between 0° C. and 45° C.

16. The method according to claim 15, wherein the vacuum malaxing is performed before the crushing of the oil-containing raw material, simultaneously with the crushing of the oil-containing raw material or subsequent to the crushing of the oil-containing raw material.

17. The method according to claim 15, wherein the vacuum malaxing is performed between 10 minutes and 60 minutes.

18. A method of treating an oil-containing raw material comprising:
   introducing a non-crushed oil-containing raw material into a vacuum vessel, the non-crushed oil-containing raw material including oil- and water-containing cells;
   subjecting the oil-containing raw material in the vacuum vessel to crushing at a reduced absolute pressure, which is below atmospheric pressure, and at a temperature to provide a crushed oil-containing raw material; and
   adapting the reduced absolute pressure and the temperature in the vacuum vessel during the crushing to maintain a ratio between the reduced absolute pressure and the temperature within 50 mm Hg of a saturated vapor pressure of the water in the oil- and water-containing cells.

19. The method according to claim 18, wherein the reduced absolute pressure in the vacuum vessel during the crushing is maintained between 4 mm Hg and 95 mm Hg, and the temperature in the vacuum vessel during the crushing is maintained between 10° C. and 35° C.

20. The method according to claim 18, wherein the reduced absolute pressure in the vacuum vessel during the crushing is maintained between 20 mm Hg and 50 mm Hg, and the temperature in the vacuum vessel during the crushing is maintained between 20° C. and 30° C.

21. The method according to claim 18, wherein the subjecting of the oil-containing raw material to crushing at the reduced absolute pressure and at the temperature occurs in a vacuum vessel, the vacuum vessel being connected to an outlet line into which flows a paste from the vacuum vessel, the method further comprising returning at least a portion of the paste in the outlet line to the vacuum vessel.

22. The method according to claim 18, further comprising vacuum malaxing the non-crushed or crushed oil-containing raw material by exposing the non-crushed or crushed oil-containing raw material to an absolute pressure between 1 mm Hg and 150 mm Hg, and a temperature between 0° C. and 45° C.

23. The method according to claim 22, wherein the vacuum malaxing is performed between 10 minutes and 60 minutes.

* * * * *